US012167985B2

(12) United States Patent
Hyvärinen

(10) Patent No.: US 12,167,985 B2
(45) Date of Patent: Dec. 17, 2024

(54) ADJUSTMENT MECHANISM FOR A HEADSET OF A TREATMENT CHAIR

(71) Applicant: PLANMECA OY, Helsinki (FI)

(72) Inventor: Pentti Hyvärinen, Helsinki (FI)

(73) Assignee: Planmeca OY, Helsinki (FI)

( * ) Notice: Subject to any disclaimer, the term of this patent is extended or adjusted under 35 U.S.C. 154(b) by 309 days.

(21) Appl. No.: 17/763,587

(22) PCT Filed: Sep. 28, 2020

(86) PCT No.: PCT/FI2020/050634
§ 371 (c)(1),
(2) Date: Mar. 24, 2022

(87) PCT Pub. No.: WO2021/058879
PCT Pub. Date: Apr. 1, 2021

(65) Prior Publication Data

US 2022/0287902 A1 Sep. 15, 2022

(30) Foreign Application Priority Data

Sep. 26, 2019 (FI) ..................................... 20195824

(51) Int. Cl.
*A61G 15/12* (2006.01)

(52) U.S. Cl.
CPC ........ *A61G 15/125* (2013.01); *A61G 2200/16* (2013.01)

(58) Field of Classification Search
None
See application file for complete search history.

(56) References Cited

U.S. PATENT DOCUMENTS

| | | | | |
|---|---|---|---|---|
| 4,647,108 | A | 3/1987 | Hayashi | |
| 5,364,164 | A | 11/1994 | Kuranami | |
| 5,642,918 | A | 7/1997 | Sakamoto et al. | |
| 5,807,255 | A | 9/1998 | Yokota et al. | |
| 7,152,927 | B1 | 12/2006 | Halstrom | |
| 10,130,542 | B1 | 11/2018 | Strawder | |
| 2015/0320625 | A1* | 11/2015 | White | A61G 15/12 297/344.12 |
| 2016/0153223 | A1 | 6/2016 | Buchholz | |

FOREIGN PATENT DOCUMENTS

| | | | |
|---|---|---|---|
| CN | 204196741 | U | 3/2015 |
| CN | 204484674 | U | 7/2015 |
| FR | 792788 | A * | 1/1936 |
| GB | 625115 | A * | 6/1949 |

(Continued)

OTHER PUBLICATIONS

Finnish Office Action for Application No. 20195824, dated Mar. 16, 2020, 2 pages.

(Continued)

*Primary Examiner* — David E Allred
(74) *Attorney, Agent, or Firm* — Lippes Mathias LLP

(57) ABSTRACT

The invention relates to a treatment chair (1) comprising a headrest (2), connected to the chair (1) with a headrest arm (4), and a position adjustment member (3) for the headrest (2). The position adjustment member (3) comprises at least one ratchet mechanism (5) to lock the headrest (2) in a wanted position.

12 Claims, 5 Drawing Sheets

(56) References Cited

FOREIGN PATENT DOCUMENTS

Figure 1:
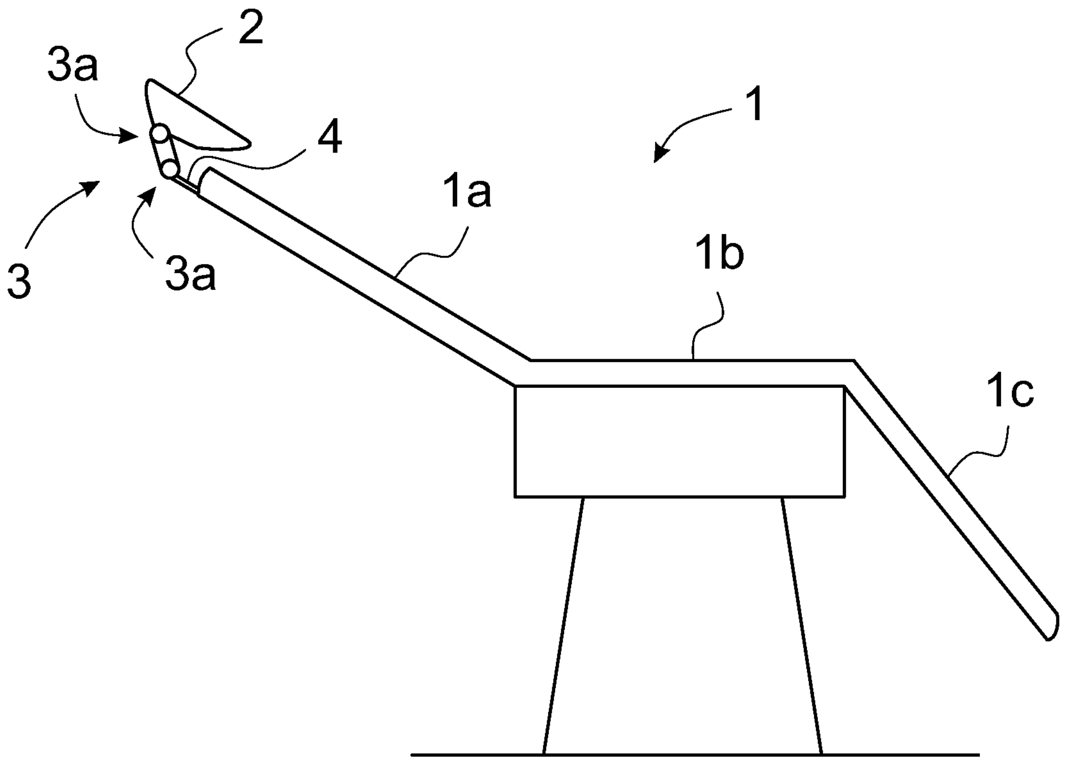

| | | | | | |
|---|---|---|---|---|---|
| JP | S5039093 | U | | 4/1975 | |
| JP | 58188023 | U | * | 12/1983 | |
| JP | H0698913 | A | | 4/1994 | |
| JP | 2008113761 | A | * | 5/2008 | |
| WO | WO-2020080699 | A1 | * | 4/2020 | ............. A61G 15/02 |

OTHER PUBLICATIONS

International Search Report for PCT/FI2020/050634, Mailed Jan. 19, 2021, 4 pages.

Written Opinion of the International Searching Authority, Mailed Jan. 19, 2021, 9 pages.

* cited by examiner

ADJUSTMENT MECHANISM FOR A HEADSET OF A TREATMENT CHAIR

FIELD OF THE INVENTION

The present invention relates to an adjustable headrest mechanism of a treatment chair, which allows adjustments relative to the back section of the chair. Often in medical and dental treatment situations, treatment chairs are provided with an adjustable headrest. The headrest is often connected to the back section in the treatment chair with an adjustable headrest member. Focus has been to produce easily adjustable headrests but nowadays the problem is to produce a durable and strong adjustable headrest for today's patients. Obesity and weight of the patients have increased among the populations worldwide. Adjustable headrests have a weak point in their mechanical adjusting construction and design since increasing number of heavier people easily exceed the weight limits of the headrest adjusting mechanisms. This results malfunctional, deformed, worn and broken headrest position adjusting mechanisms at dentist receptions and also elsewhere. The strength and quality of the position adjustment mechanism of the treatment chair is essential for durability in daily use.

The headrest is connected to the upper section of the treatment chair's back section with the help of a position adjustment member and is adjusted with it relative to the chair back section to fit for every patient's physical body shape. One problem is that the adjusting mechanism and its locking systems are heavily overloaded when today's heavier patients are treated during operation.

BACKGROUND OF THE INVENTION

The present invention relates to a problem of insufficient rigidity and durability of adjustable headrest mechanisms under use with heavy patients. The present invention relates to rigidness, strength and durability of the adjusting mechanism connected to the headrest and the back section of the treatment chair. Preferably the rigidness and robust construction are achieved by using square-shaped pawl elements with flat counter surface to resist heavy loads.

OBJECT OF THE INVENTION

The object of the present invention is to achieve a quickly adjustable and easily usable adjusting mechanism for headrests in treatment chairs with small adjusting steps, which mechanism is user-friendly and also hygienic, silent and durable with high resistance to heavy loads.

The adjusting mechanism according to the invention is characterized by what is disclosed in the characterization part of claim 1. Other embodiments of the invention are characterized by what is disclosed in the other claims.

BRIEF DESCRIPTION OF THE INVENTION

The present invention provides an adjusting mechanism having at least one cylindrical ratchet element comprising several parallel rows of recesses, several pawls and a release mechanism to withdraw the pawl heads from the recesses. The pawl heads and the recesses on the cylindrical ratchet element are formed to correspond each other. In each row, the recesses are arranged one after the other on the periphery of the ratchet element at an angular distance from each other and all the recesses in the same row are on the same plane of rotation. The rotational motion of each recess is only a part of the whole circle. Preferably, the plane of rotation of each row of recesses is centered with the vertical plane going through the longitudinal center line of the pawl with which each row of recesses is in contact.

The parallel rows of recesses are arranged so that only one pawl at a time may enter in a recess. That is achieved by arranging the position of each row of recesses by a required angle. The recesses are arranged e.g. according to the Vernier principle. With a set of several parallel pawls the invention provides an adjustment mechanism with sufficiently small adjustment steps and high weight resistance. A spring at the second end of each pawl is arranged to press the pawl's head to the nearest recess on the cylindrical ratchet element. The release mechanism is arranged to move all the pawls when actuating the release handle but only one pawl head at a time is withdrawn and released from the recess of the cylindrical ratchet element while other pawls are following the outer surface of the cylindrical ratchet element.

The adjusting mechanism comprise a rigid frame and a rigid lid, which compensate the unsymmetrical stress, which can occur when a pawl not in middle is accommodated inside a recess and taking up the load. The adjustment mechanism according to the invention comprises several parallel pawls where the pawl heads are shaped to fit into the recesses on the cylindrical ratchet element. The recesses are organized so that only one pawl head at a time can be in a locking position inside a recess.

ADVANTAGES OF THE INVENTION

The materials of the new mechanism can withstand heavy loads and the mechanism can be safely adjusted as needed. Safety is also enhanced by the fact that, if one of the load-bearing pawls is damaged or even broken, the next pawl will take over the load after 5-10° degrees rotation. Such a small movement will minimize the chance of an injury.

In some known solutions, when adjusting the headrest according to the patient's position, the adjustment requires both hands to be used by the operator of the chair. One hand reduces the pressure on the headrest mechanism and the other hand simultaneously presses the release lever located on the side of the mechanism. The lever must be pressed regardless of whether the joints of the mechanics are adjusted up or down. Since the treatment work is mainly done with sterile gloves in the hands, the headrest must be carefully cleaned when changing patients, which creates requirements for the cleaning of the surfaces.

The new arrangement facilitates the treatment work of the treatment staff. Both joints of the headrest construction can turn up without pressing the release lever. The pawls are arranged so that they can withdraw from the recesses along the sloping surface of the recesses allowing the cylindrical ratchet element to rotate relatively to the pawls. The spring at the second end of each pawl tends to press the pawl's head into the nearest recess, to which it locks when lifting of the headrest is stopped. Both joints are arranged to lock in the position where the lifting is stopped. The release lever does not need to be pressed and the headrest can be adjusted upwards with one hand, either both joints simultaneously or only one joint alone. The adjustment can also be done without touching the palm of the hand, for example lifting with the wrist or even with the knee. This greatly speeds up the adjustment and at least one hand remains sterile. The downward adjustment is made for safety reasons so that the other hand will lighten the headrest and the patient's head and the other hand will release the locked joints from the release lever. At the end of the adjustment the release lever is freed and the both headrest joints lock into the next recesses. The shape of both the pawl heads is shaped so that the load does not cause the pawl heads to break out of the recess but instead tends to lock into the recess to ensure a reliable locking.

One advantage of the solution according to the invention is that the structure is adjustable in extremely small steps, and it is rigid, strong, durable, quickly adjustable, easy to use and also hygienic. Rigidness and strength are achieved by maximizing the pawl head's contact area on the load bearing surfaces of the recesses. Preferably, the counter surface area is maximized, for instance, by using pawls with square cross-section instead of round pawls.

The small or dense gradation in adjusting the headrest is achieved by increasing the number of the pawls and rows of recesses on the cylindrical ratchet element. For every pawl head the cylindrical ratchet element has a row of recesses to be fitted in, and every row of recesses is arranged to a certain angle relative to the other rows of recesses. This enables a dense locking positioning when locking the headrest. Implementing the Vernier principle with placing the pawls on the cylindrical ratchet element ensures that one pawl head at a time is inserted inside one recess.

The recesses are formed corresponding to the pawl heads, in the way that their relative movement is possible only in one direction. That makes the headrest position adjustment member to operate like a ratchet, free movement to one direction and locked to the other direction. The attached pawl release mechanism unlocks the pawls and allows the movement to both directions to adjust the headrest to a desired position when all pawl heads are withdrawn from the recesses.

LIST OF FIGURES

Figure 2:
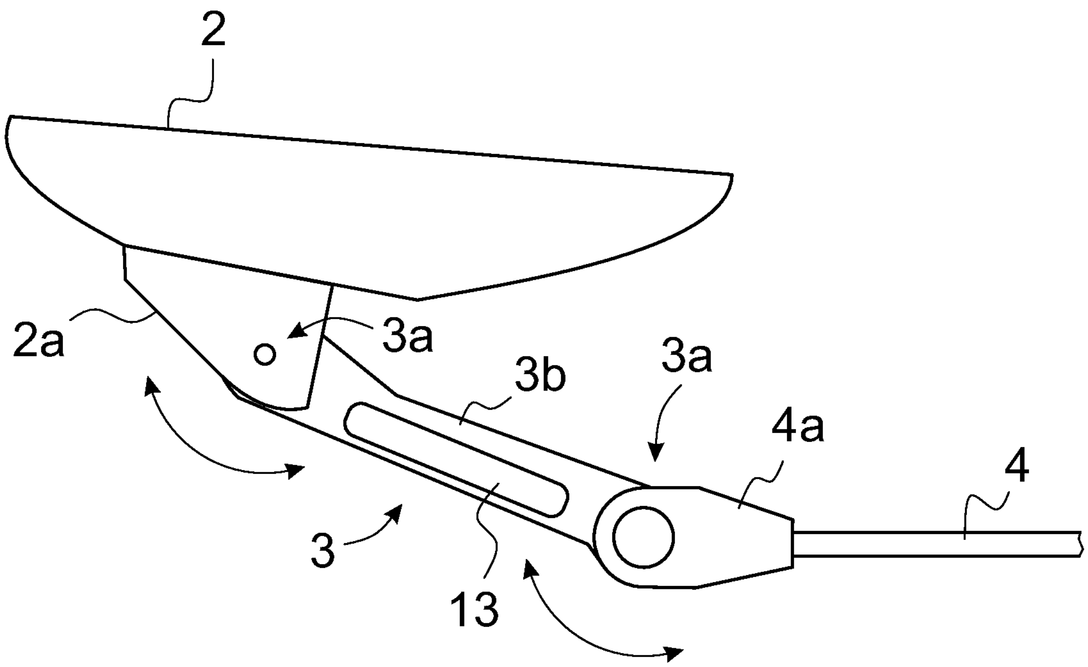
Figure 3:
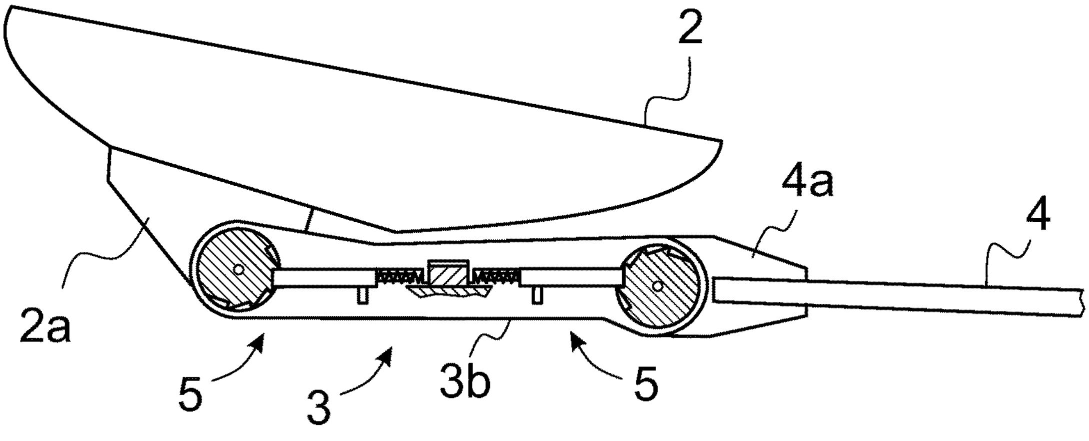
Figure 4:
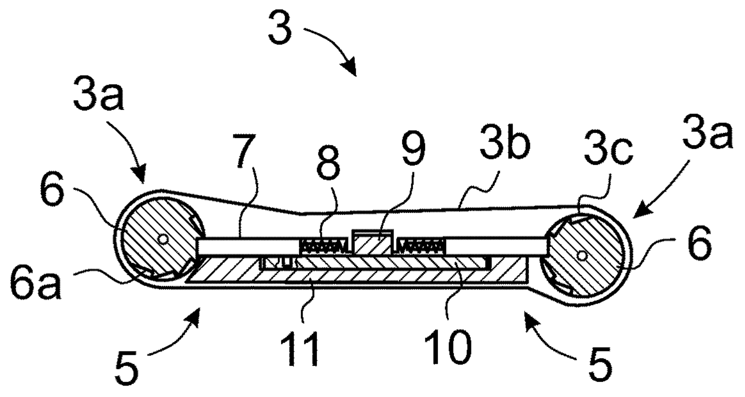
Figure 5:
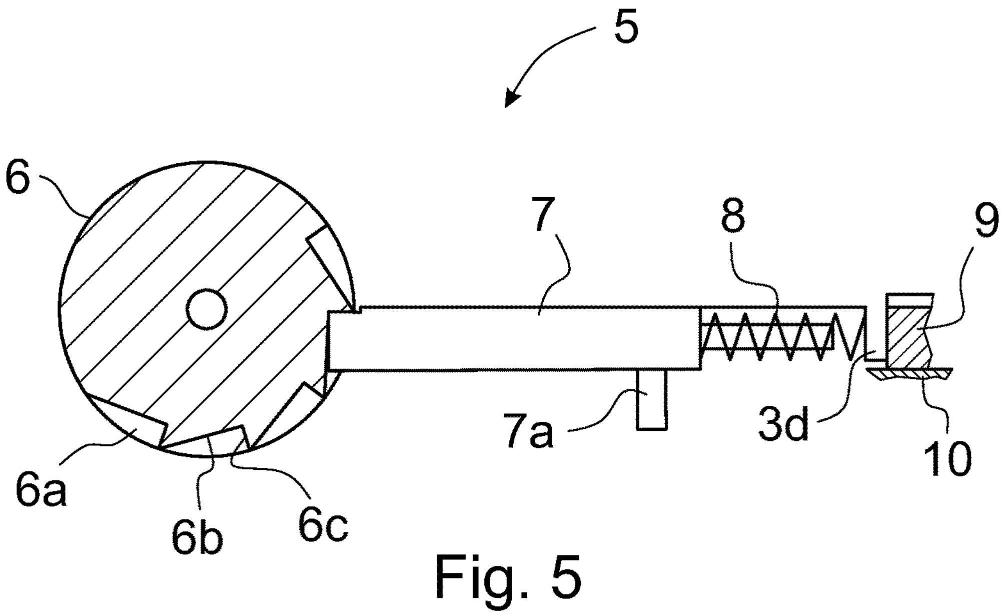
Figure 6:
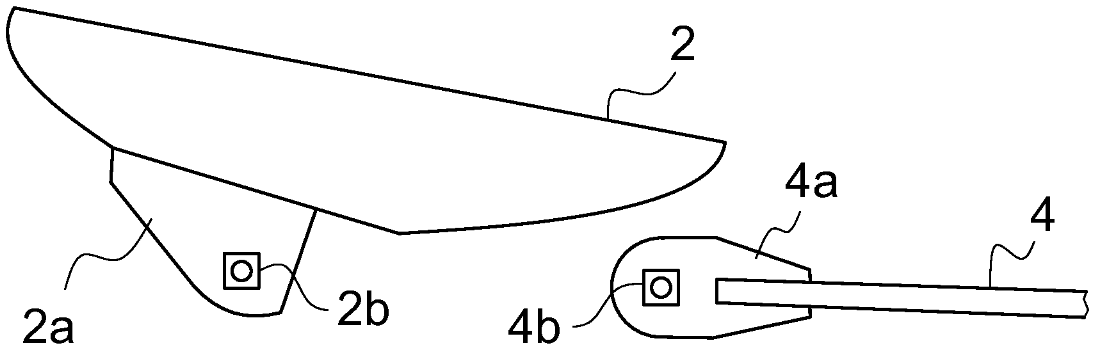
Figure 7:
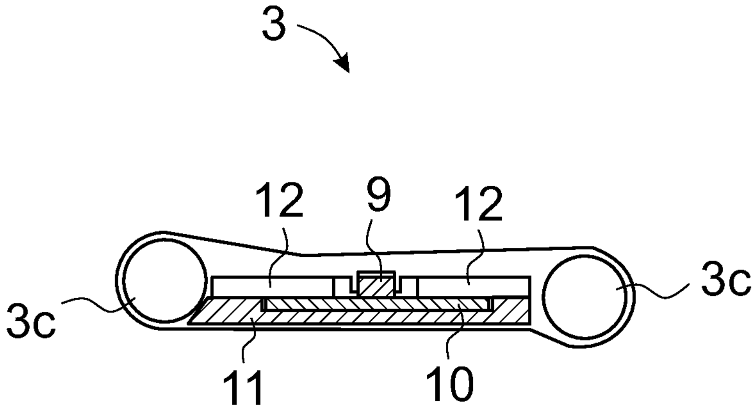
Figure 8:
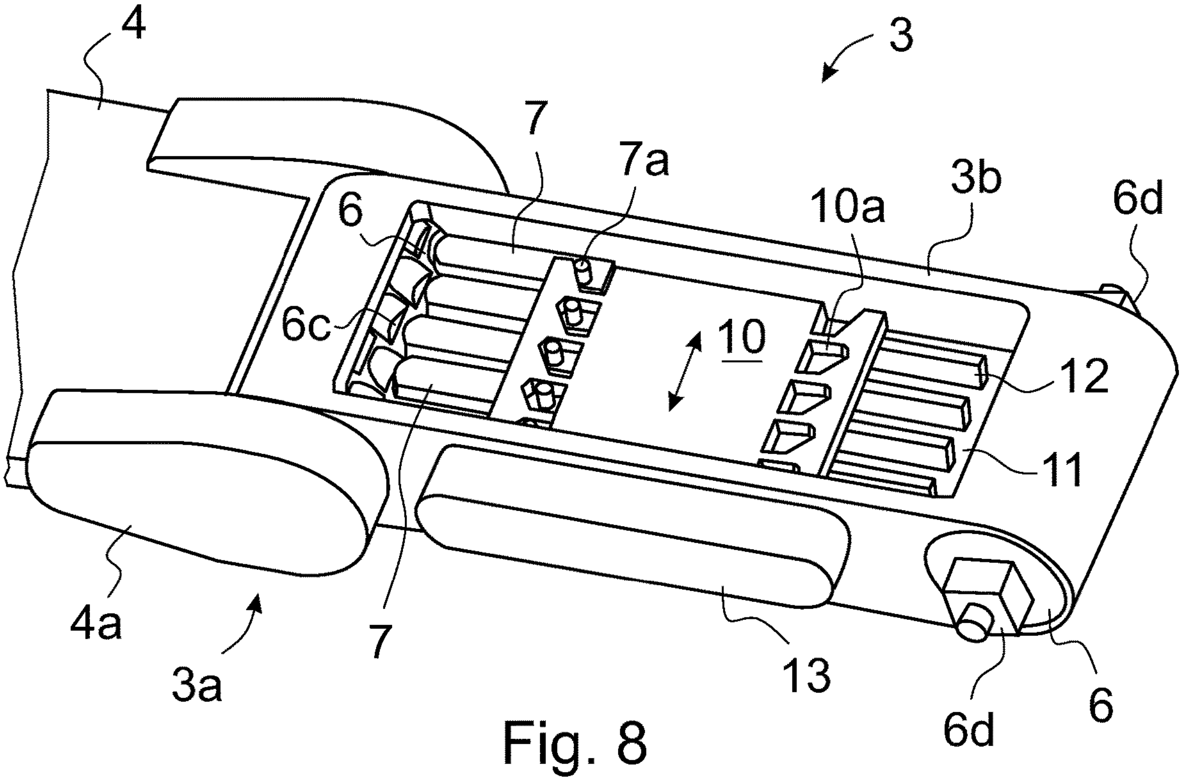
Figure 9:
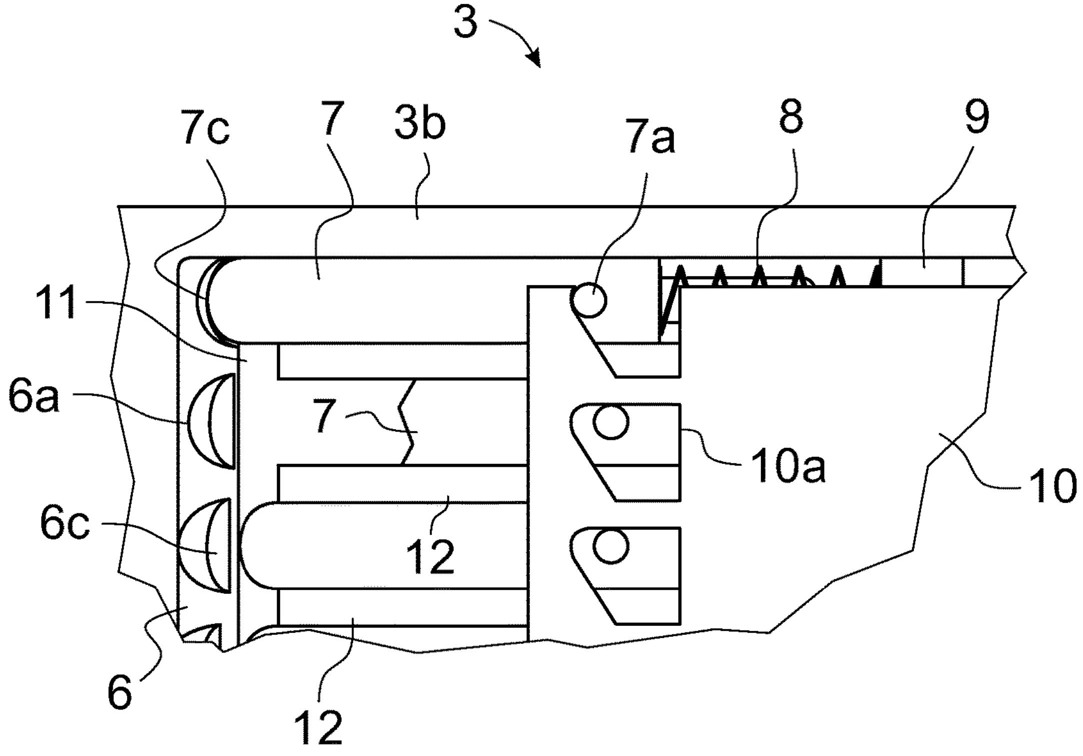
Figure 10:
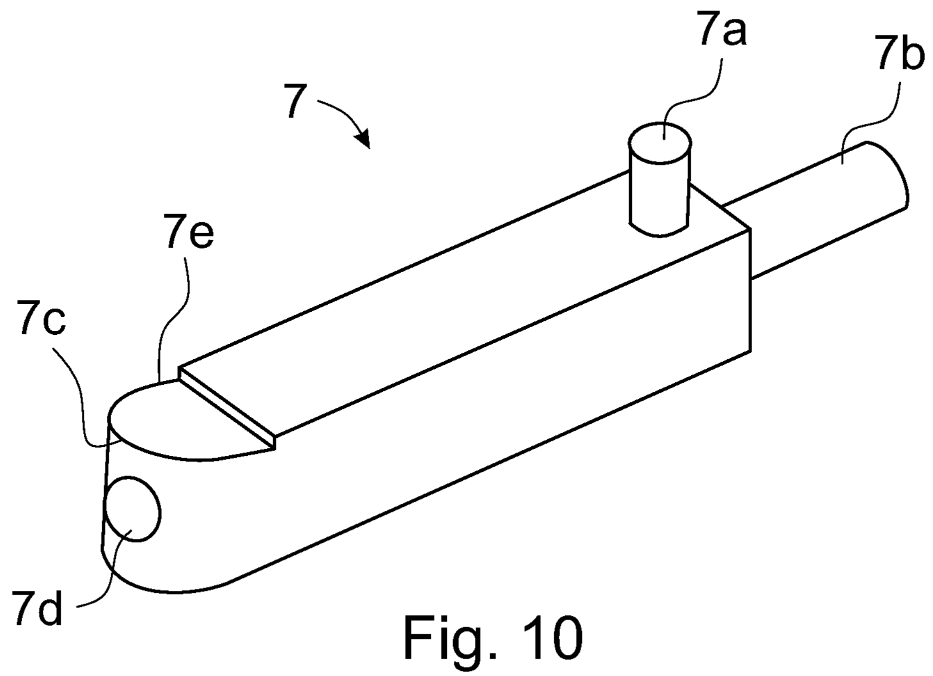
Figure 11:
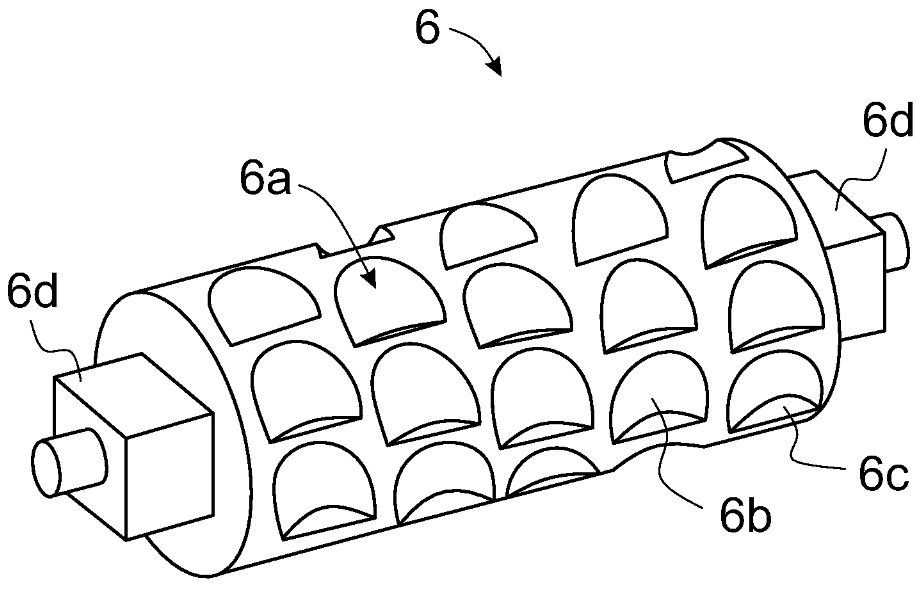

In the following, the invention will be described in detail by the aid of example embodiments by referring to the attacked simplified and diagrammatic drawings, wherein FIG. 1 presents in a side view a treatment chair comprising a headrest and its position adjustment member according to the invention, FIG. 2 presents in a side view a headrest with its position adjustment member according to the invention, FIG. 3 presents in a side view a headrest with its position adjustment member according to the invention, the adjustment member cross-sectioned, FIG. 4 presents in a side view and cross-sectioned a position adjustment member according to the invention, FIG. 5 presents in a side view an enlarged cross-section of a ratchet mechanism of a position adjustment member according to the invention, FIG. 6 presents in a side view a headrest according to the invention without its position adjustment member so that its fastening lugs of one side are visible, FIG. 7 presents in a side view a cross-section of a position adjustment member according to the invention without the ratchet mechanisms, FIG. 8 presents in an oblique view the inner parts of a position adjustment member according to the invention, FIG. 9 presents in a top view an enlarged corner of the inside of a position adjustment member according to the invention, FIG. 10 presents in an oblique view a pawl or pawl element of a position adjustment member according to the invention, and FIG. 11 presents in an oblique view a cylindrical ratchet element of a position adjustment member according to the invention.

DETAILED DESCRIPTION OF THE INVENTION

In order to achieve the objects mentioned above, the present invention provides a strong and robust position adjustment member connected between the headrest arm and the headrest of a treatment chair. The structure of the headrest and its components are presented in the figures in a schematic and simplified way. In that case all the components and forms of the structures are not necessarily presented.

FIG. 1 presents in a side view a treatment chair 1 comprising a headrest 2, a position adjustment member 3 according to the invention, a headrest arm 4, a back section 1*a*, a seat section 1*b* and a leg section 1*c*. The position adjustment member 3 comprises a lockable joint 3*a* at both of ends of its frame 3*b*, which joints 3*a* allow the headrest 2 to be positioned and adjusted in relation to the back section 1*a*.

FIG. 2 presents in a side view an advantageous embodiment of the invention. The headrest 2 has two parallel fastening lugs 2*a* with which the headrest 2 is articulated to the first joint 3*a* of the position adjustment member 3. Correspondingly, the second end of the position adjustment member 3 is articulated with the second joint 3*a* to the two parallel fastening lugs 4*a* of the headrest arm 4. Thus, the headrest 2 can be turned around the first joint 3*a* in relation to the position adjustment member 3 and the position adjustment member 3 can be turned around the second joint 3*a* in relation to the headrest arm 4 that is inserted into the back section 1*a* of the treatment chair 1.

In addition, the position adjustment member 3 comprises a release member 13 for unlocking the joints 3*a* to adjust the headrest 2 into another desired position.

FIGS. 3-5 present in a side view different cross-sections of the position adjustment member 3 of the invention. In FIG. 3 the first part of the components of the position adjustment member 3 is visible and in FIG. 4 the second part of the components of the position adjustment member 3 is visible. FIG. 5. presents an enlarged cross-section of a ratchet mechanism 5 of the position adjustment member 3 according to the invention.

As mentioned above, the position adjustment member 3 comprises the frame 3*b* and the joint 3*a* at each end of the frame 3*b*. For each joint 3*a* the frame 3*b* comprises a round fulcrum hole 3*c* at each of its end and the ratchet mechanism 5 inside the frame 3*b*. The ratchet mechanism 5 comprises a cylindrical ratchet element 6 that acts also as a fulcrum pin and is placed inside the fulcrum hole 3*c* at each end of the frame 3*b*. The cylindrical ratchet element 6 comprises a group of parallel rows of recesses 6*a* on its cylindrical surface.

The ratchet mechanism 5 further comprises a group of parallel pawls 7 and springs 8, and a counter element 3*d* that is fixedly fastened to the frame 3*b*. The springs 8 are arranged to press the pawls 7 towards the cylindrical ratchet element 6 in order to bring the head of the pawl 7 in contact with the row of the recesses 6*a*. The pawl 7 is arranged to prevent the rotation of the cylindrical ratchet element 6 in one direction when the pawl 7 is entered into a recess 6*a*. A rotation to the other direction is not prevented.

The position adjustment member 3 also comprises a release mechanism 10 with its guide element 9, which release mechanism 10 is arranged to allow the rotation of the cylindrical ratchet element 6 in both directions by pulling the pawl 7 out from the recess 6*a* when the release member 13 is pressed. For that purpose, the pawl 7 has a release pin 7*a*.

In addition, the position adjustment member 3 comprises a bottom element 11 inside the frame 3*b*. The bottom element 11 is arranged to support the pawls 7 which prevent the cylindrical ratchet element 6 from rotating in the fulcrum hole 3*c* at the first end of the frame 3*b*. The corresponding support arrangement is at the second end of the frame 3*b*.

FIG. 5 presents in a side view an enlarged cross-section of an advantageous ratchet mechanism 5 of a position adjustment member 3 according to the invention. The recesses 6*a* of the cylindrical ratchet element 6 have a counter surface 6*b* and a support surface 6*c*. When a recess 6 turns into the same line with a pawl 7 the pawl 7 is pushed into the recess 6*a* by the spring 8 associated with the pawl 7 and placed between the pawl 7 and the counter element 3*d*. The linear motion of the pawl 7 is stopped by the counter surface 6*b* and the support surface 6*c* is pressed against the pawl 7 by the pressure caused by the headrest 2.

FIG. 6 presents in a side view a headrest 2 and the first end of the headrest arm 4 according to the invention without the position adjustment member 3 so that their fastening lugs 2*a* and 4*a* of one side are visible. The fastening lugs 2*a* of the headrest 2 comprise square coupling elements 2*b* and the fastening lugs 4*a* of the headrest arm 4 comprise square coupling elements 4*b*. The coupling elements 2*b*, 4*b* are arranged to connect the cylindrical ratchet element 6 immovably to the fastening lugs 2*a*, 4*a*. This means that the first cylindrical ratchet element 6 placed into the coupling elements 2*b* does not move or rotate in relation to the headrest 2 and the second cylindrical ratchet element 6 placed into the coupling elements 4*b* does not move or rotate in relation to the headrest arm 4.

FIG. 7 presents in a side view a cross-section of a position adjustment member 3 according to the invention without the ratchet mechanisms 6. The fulcrum holes 3*c* that act as rotation chambers of the cylindrical ratchet elements 6 are empty and two of the guide rails 12 for the pawls 7 above the bottom 11 are visible.

FIGS. 8 and 9 present an advantageous headrest position adjustment member 3 according to the invention without its cover. FIG. 8 presents the headrest position adjustment member 3 in an oblique top view. The mechanical construction of the headrest position adjustment member 3 comprises at least one cylindrical ratchet element 6 with several rows of recesses 6*a*. For each row of recesses 6*a* the adjustment mechanism comprises a corresponding pawl 7. The pawls 7 and recesses 6*a* are arranged to locate relatively so that only one pawl's head 7*c* at a time can be accommodated inside a recess 6*a*.

In the situation of FIGS. 8 and 9 the head 7*c* of the upper-most pawl 7 is accommodated inside a recess 6*a* and is therefore responsible for locking the first direction of rotation of the cylindrical ratchet element 6 of the joint 3*a* between the headrest arm 4 and the position adjustable member 3.

The release mechanism 10 is arranged to withdraw the pawl head 7*c* from the recess 6*a* by actuating the release pin 7*a*. The release mechanism 10 comprises a set of release members 10*a*, which are in this embodiment diagonal edges in a frame plate of the release mechanism 10. The diagonal edges are in contact with release pins 7*a* so that when the release member 13 is pressed the diagonal edges in the frame plate draw all the pawls 7 outwards from the ratchet element 6.

Withdrawing the pawl heads 7*c* from the recess 6*a* by operating the release member 13 disables the ratchet function and releases the joints 3*a* at the ends of the position adjustment member 3 so that the position adjustment member 3 and the headrest 2 can be turned to both directions.

FIG. 9 presents in a top view a part of the position adjusting member 3 without its cover. For the sake of clarity, the second uppermost pawl 7 in the figure has been cut so that the end of the guide rails 12 between the parallel pawls 7 are better noticeable. Also, in this situation the head 7*c* of the uppermost pawl 7 is accommodated inside a recess 6*a*.

FIG. 10 presents in an oblique top view a pawl or pawl element 7 according to the invention. In addition to the frame part with a square cross section the pawl 7 comprises a head part 7*c*, a release pin 7*a*, a spring guide 7*b*, a damper 7*d* and a slant recess 7*e* at the head of the pawl 7. The head part 7*c* is fitted to match with the form of the recess 6*a* of the ratchet element 6. The damper 7*d* can be e.g. a rubber pad in the head part 7*c* of the pawl 7. The slant recess 7*e* forms a contact surface with the support surfaces 6*c* of the recesses 6*a* of the ratchet element 6 on that side of the pawl 7 which is in contact with the support surfaces 6*c*. Preferably, the slant recess 7*e* becomes deeper from the first end of the pawl 7, where the head part 7*c* is, towards the second end of the pawl 7. The slanting contact surface of the slant recess 7*e* prevents the head of the pawl 7 from accidentally disengaging from inside the recess 6*a* when the position of the headrest 2 is adjusted. This improves safety.

FIG. 11 presents in an oblique top view a cylindrical ratchet element 6 according to the invention. The surface of the cylindrical ratchet element 6 comprises several parallel rows of recesses 6*a*. Preferably, each row cover only a part of the whole periphery of the ratchet element 6. For instance, one row may have five recesses 6*a* which are placed at intervals of 40 degrees. With five parallel similar rows where each row is shifted 8 degrees from its adjacent row 25 different locking places are achieved at 8 degrees intervals.

As mentioned in the description above, the recesses 6*a* comprise two surfaces, a curvilinear counter surface 6*b* and a flat support surface 6*c*. Preferably, the angle between the counter surface 6*b* and the support surface 6*c* is 90 degrees, but it may also be another angle depending on the shape of the head part 7*c* of the pawl 7.

The rows of recesses 6*a* are arranged to a certain angle relative to the other rows of recesses 6*a*. With a set of parallel pawls 7, this allows a dense adjustment, locking and positioning of the headrest 2 despite a robust and strong construction. The cylindrical ratchet element 6 comprise square fastening ends 6*d* to be installed into the fastening lugs 2*a* and 4*a* to prevent the first ratchet element 6 from rotating in relation to the headrest 2 and the second ratchet element 6 from rotating in relation to the headrest arm 4. Thus, the first ratchet mechanism 5 is non-rotatably connected with the headrest 2 and the second ratchet mechanism 5 is nonrotatably connected with the headrest arm 4.

As described above, moving the headrest 2 and/or the position adjustment member 3 will cause the cylindrical ratchet element 6 to move relatively to the pawls 7. And because the rows of recesses 6*a* are arranged to a certain angle relative to each other each of the pawl heads 7*c* are pushed one at a time into a recess 6*a* corresponding in their row of recesses 6*a* when a certain rotation angle is achieved.

It is obvious to the person skilled in the art that the invention is not restricted to the examples described above but that it may be varied within the scope of the claims presented below. Thus, for instance the design of the pawl heads can vary and therefore the inner surfaces and of the recesses can vary correspondingly.

It is also obvious to the person skilled in the art that the cross-section of the pawls need not necessarily be square. It can be, for instance, rectangular or any suitable shape that makes it possible to construct a reliable, strong and robust device structure.

The invention claimed is:

1. A treatment chair comprising a headrest, connected to the chair with a headrest arm, and a position adjustment member for the headrest, characterized in that the position adjustment member comprises at least one ratchet mechanism with pawls to lock the headrest in a wanted position, wherein the pawls are arranged to block the rotation of a ratchet element of the at least one ratchet mechanism to one direction and to allow the rotation of the ratchet element to another direction, wherein the ratchet mechanism comprises more than one pawl to form a group of parallel pawls and the ratchet element is a cylindrical ratchet element defining an axis of rotation and being operatively coupled to the more than one pawl, the cylindrical ratchet element comprising a group of recesses arranged at angular positions relative to each other about the axis of rotation for the more than one pawl to stop and lock the rotation of the cylindrical ratchet element in a first direction of rotation of the cylindrical ratchet element, wherein recesses of the group of recesses are arranged in rows one after the other on the cylindrical ratchet element, and all the recesses in the same row are in the same plane at an outer surface of the cylindrical ratchet element, and wherein row of the recesses is adjacent another of the rows, and in each row of the recesses the angular position of the recesses on the cylindrical ratchet element is different from the angular position of the recesses of the other rows.

2. A treatment chair according to claim 1, characterized in that the difference of angular positions of the recesses in the rows of the recesses on the cylindrical ratchet element is between 1 to 10 degrees.

3. A treatment chair according to claim 1, characterized in that the cylindrical ratchet element comprises the rows of recesses on its outer surface.

4. A treatment chair according to claim 1, characterized in that the ratchet mechanism comprises equal number of pawls and rows of recesses.

5. A treatment chair according to claim 1, characterized in that the recesses comprise support surfaces and the pawls are brought into contact with the support surfaces of the recesses one at a time.

6. A treatment chair according to claim 1, characterized in that the ratchet mechanism comprises a release mechanism that is arranged to unlock the cylindrical ratchet element to be rotated in both directions.

7. A treatment chair according to claim 1, characterized in that the position adjustment member comprises a first and second ratchet mechanism, one at each end of the position adjustment member.

8. A treatment chair according to claim 7, characterized in that the first ratchet mechanism is non-rotatably connected with the headrest and the second ratchet mechanism is non-rotatably connected with the headrest arm.

9. A treatment chair according to claim 1, characterized in that the difference of angular positions of the recesses in the rows of recesses on the cylindrical ratchet element is between 3 to 7 degrees.

10. A treatment chair according to claim 1, characterized in that the difference of angular positions of the recesses in a row of recesses on the cylindrical ratchet element is between about 5 to 6 degrees.

11. A treatment chair comprising a headrest connected to the chair with a headrest arm, and a position adjustment member for the headrest, wherein the position adjustment member comprises at least one ratchet mechanism with pawls to lock the headrest in a wanted position, wherein the pawls are arranged to block the rotation of a ratchet element of the at least one ratchet mechanism to one direction and to allow the rotation of the ratchet element to another direction, wherein the pawls form a group of parallel pawls and the ratchet element is a cylindrical ratchet element comprising a plurality of rows of recesses operatively coupled to the group of parallel pawls, characterized in that rows of recesses comprise a group of recesses configured to be engaged by the group of parallel pawls to stop and lock the rotation of the ratchet element in a first direction of rotation of the cylindrical ratchet element, and wherein the cylindrical ratchet element comprises the rows of recesses on its outer surface.

12. A treatment chair comprising a headrest connected to the chair with a headrest arm, and a position adjustment member for the headrest, wherein the position adjustment member comprises at least one ratchet mechanism with pawls to lock the headrest in a wanted position, wherein the pawls are arranged to block the rotation of a ratchet element of the at least one ratchet mechanism to one direction and to allow the rotation of the ratchet element to another direction, wherein the position adjustment member comprises two ratchet mechanisms, one at each end of the position adjustment member, the first ratchet mechanism being non-rotatably connected with the headrest and the second ratchet mechanism being non-rotatably connected with the headrest arm, characterized in that each of the two ratchet mechanisms comprises a plurality of the pawls, wherein each plurality of the pawls comprises to form a group of parallel pawls and the ratchet element is a cylindrical ratchet element comprising a plurality of rows of recesses operatively coupled to the group of parallel pawls, the rows of recesses including a group of recesses configured to be engaged by the group of parallel pawls to stop and lock the rotation of the ratchet element in a first direction of rotation of the ratchet element, and wherein the ratchet mechanism comprises an equal number of the pawls and the rows of recesses.

* * * * *